(No Model.)
E. E. DURYEA & P. H. GRIMM.
APPARATUS FOR COOLING LIQUIDS.
No. 271,436. Patented Jan. 30, 1883.
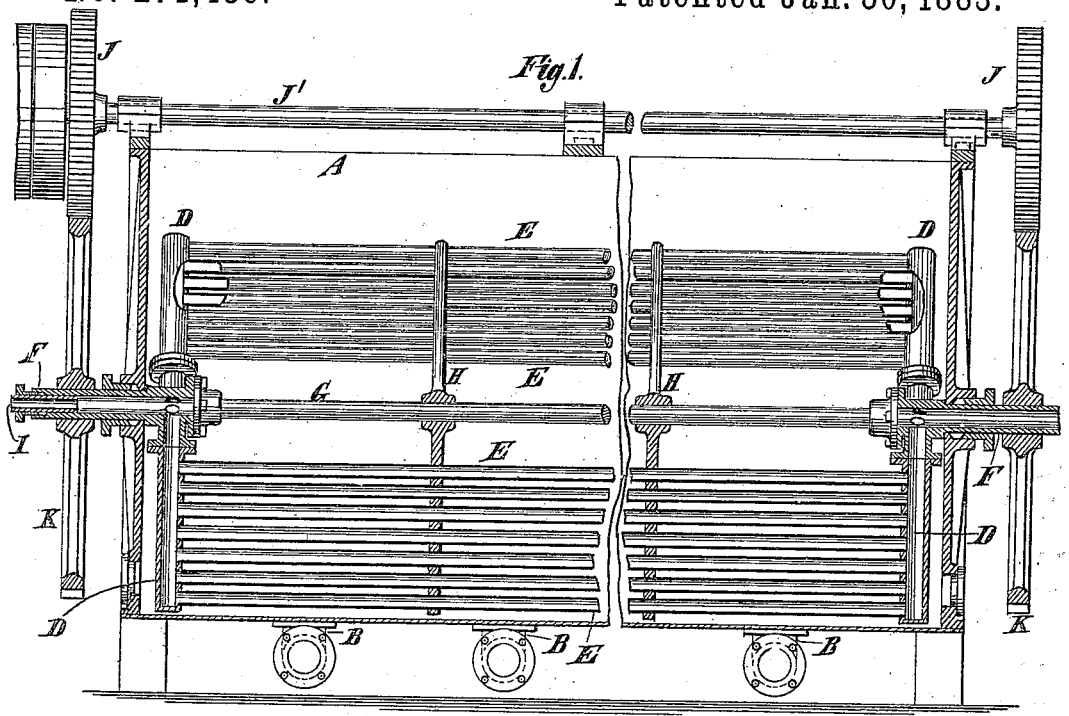
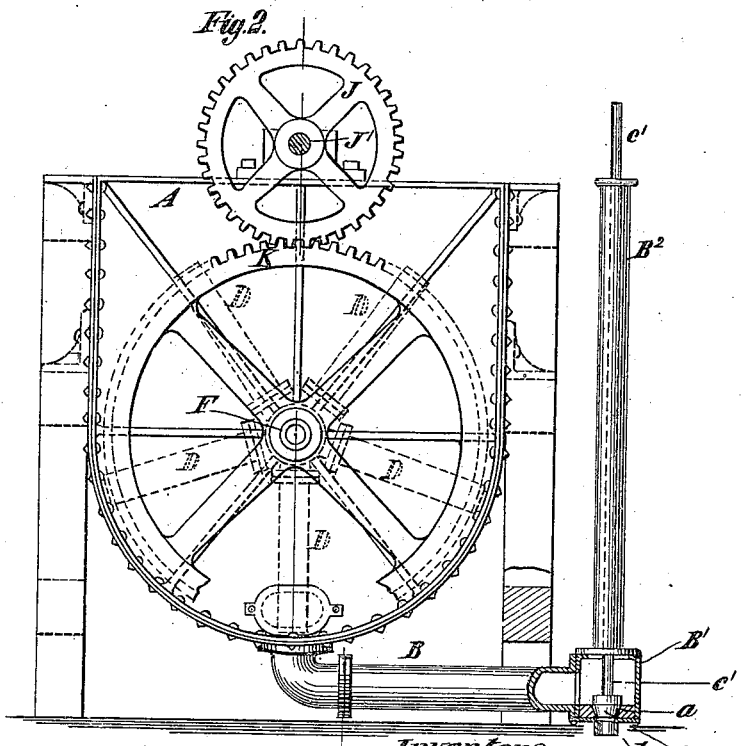

UNITED STATES PATENT OFFICE.

EDGAR E. DURYEA AND PAUL H. GRIMM, OF GLEN COVE, ASSIGNORS TO THE GLEN COVE MANUFACTURING COMPANY, OF NEW YORK, N. Y.

APPARATUS FOR COOLING LIQUIDS.

SPECIFICATION forming part of Letters Patent No. 271,436, dated January 30, 1883.

Application filed August 10, 1882. (No model.)

*To all whom it may concern:*

Be it known that we, EDGAR E. DURYEA and PAUL H. GRIMM, of Glen Cove, in Queens county, in the State of New York, have invented a certain Improvement in Apparatus for Cooling Liquids, of which the following is a specification.

The improvement consists in the combination, in an apparatus for cooling liquid, of a tank for the reception of the liquid to be cooled, an outlet pipe or pipes extending laterally therefrom, a valve box or boxes, a tube or tubes extending from the latter, and a valve or valves for controlling the egress of the liquid from the box or boxes, and having a stem or stems extending through the said tube or tubes. The height of the liquid may be determined from the said tube or tubes, and the egress of the liquid may be conveniently controlled.

The improvement also consists in the combination, in an apparatus for cooling liquid, of a tank for the reception of the liquid to be cooled, two rotary end pieces or spiders, each comprising a hollow journal and hollow radial arms, a series of radial wings, each composed of a number of pipes connected at the ends with said radial arms, whereby continuous passages are formed through the whole structure, and means for supplying a cooling agent to one of the hollow journals and for conducting the cooling agent from the other journal. With the above we combine gear-wheels, secured one on each journal, and a driving-shaft provided with two gear-wheels which engage with the wheels on the journals, and thereby impart motion directly to both journals.

In the accompanying drawings, Figure 1 is a sectional elevation of an apparatus embodying our improvement, and Fig. 2 is an end elevation thereof.

Similar letters of reference designate corresponding parts in both figures.

A designates a tank for the reception of the liquid to be cooled. It preferably has a rounded bottom, vertical sides and ends, and an open top, through which the liquid may be introduced. It is provided at the bottom with outlet-pipes B, which extend laterally beyond it and terminate in valve-chambers B'. These valve-chambers are furnished at the bottom with blocks of wood or other material, $a$, suitable for forming valve-seats, and they preferably have spouts $b$.

The valves $c$ may advantageously be made of wood, and are of conical form. They have stems $c'$, which extend up through tubes $B^2$, which are open at the upper end.

The liquid to be cooled attains the same level in the tubes $B^2$ as in the tank A. When the liquid has been cooled to the desired degree the valves $c$ are lifted through the agency of their stems $c'$ and the liquid allowed to run off into any suitable receptacle.

The means through which the cooling agent passes consists essentially of two end pieces or spiders, D, comprising hubs and hollow arms radiating therefrom, and series of pipes E, extending between the arms of the end pieces and connected directly with the sides of the arms. The pipes E of each series are arranged in close proximity to each other, and the several series of pipes form radial or radiating wings. The end pieces, D, are secured to hollow journals F, which are supported in bearings in the ends of the tank. A shaft, G, extends between the end pieces and secures them and the journals together. Spiders H, arranged upon this shaft, support the pipes E between the spiders or end pieces, D.

The cooling agent may consist of water or any suitable fluid or gas. It is supplied to one of the journals F by means of a stationary pipe, I, leading into the same through a stuffing-box, and it may be carried off from the other journal in a similar manner. From the journal which it enters it passes to the hollow arms of the adjacent end piece, thence into the pipes E, thence into the hollow arms of the other end piece, thence into the other journal, and off through the delivery-pipe.

On the journals F are gear-wheels K, with which engage gear-wheels J, mounted on a shaft, J'. This shaft may be supported in bearings arranged on the top of the tank. The said shaft is provided with a driving-pulley and idler, so that it may be driven by a belt.

The end pieces, D, and pipes E are rotated within the tank, so that they will pass through and agitate the liquid in the tank. As the power for rotating them is applied to both the hollow journals, the liability of unequal straining is obviated.

Obviously, although the apparatus is shown as designed for use in a horizontal position, it can be used in any other position if the tank is made cylindrical and open at one end.

What we claim as our invention, and desire to secure by Letters Patent, is—

1. In an apparatus for cooling liquid, the combination of a tank for the reception of the liquid to be cooled, an outlet pipe or pipes extending laterally therefrom, a valve box or boxes, a tube or tubes extending from the latter, and a valve or valves for controlling the egress of the liquid from the box or boxes, and having a stem or stems extending through the said tube or tubes, substantially as specified.

2. In an apparatus for cooling liquid, the combination of a tank for the reception of the liquid to be cooled, two rotary end pieces or spiders, each comprising a hollow journal and hollow radial arms, a series of radial wings, each composed of a number of pipes connected at the ends with said radial arms, whereby continuous passages are formed through the whole structure, and means for supplying a cooling agent to one of the hollow journals and for conducting the cooling agent from the other journal, substantially as specified.

3. In an apparatus for cooling liquid, the combination of two rotary end pieces or spiders, each comprising a hollow journal and hollow radial arms, a series of radial wings, each composed of a number of pipes connected at the ends with said arms, whereby continuous passages are formed through the whole structure, means for supplying a cooling agent to one of the hollow journals and for conducting the cooling agent from the other journal, gear-wheels upon the journals, and a driving-shaft provided with two gear-wheels which engage with the wheels on the journals, and thereby impart motion directly to both journals, substantially as specified.

EDGAR E. DURYEA.
PAUL H. GRIMM.

Witnesses:
WM. B. ROBINSON,
E. T. PAYNE.